REVERSED FUEL CELL AND OXYGEN GENERATOR

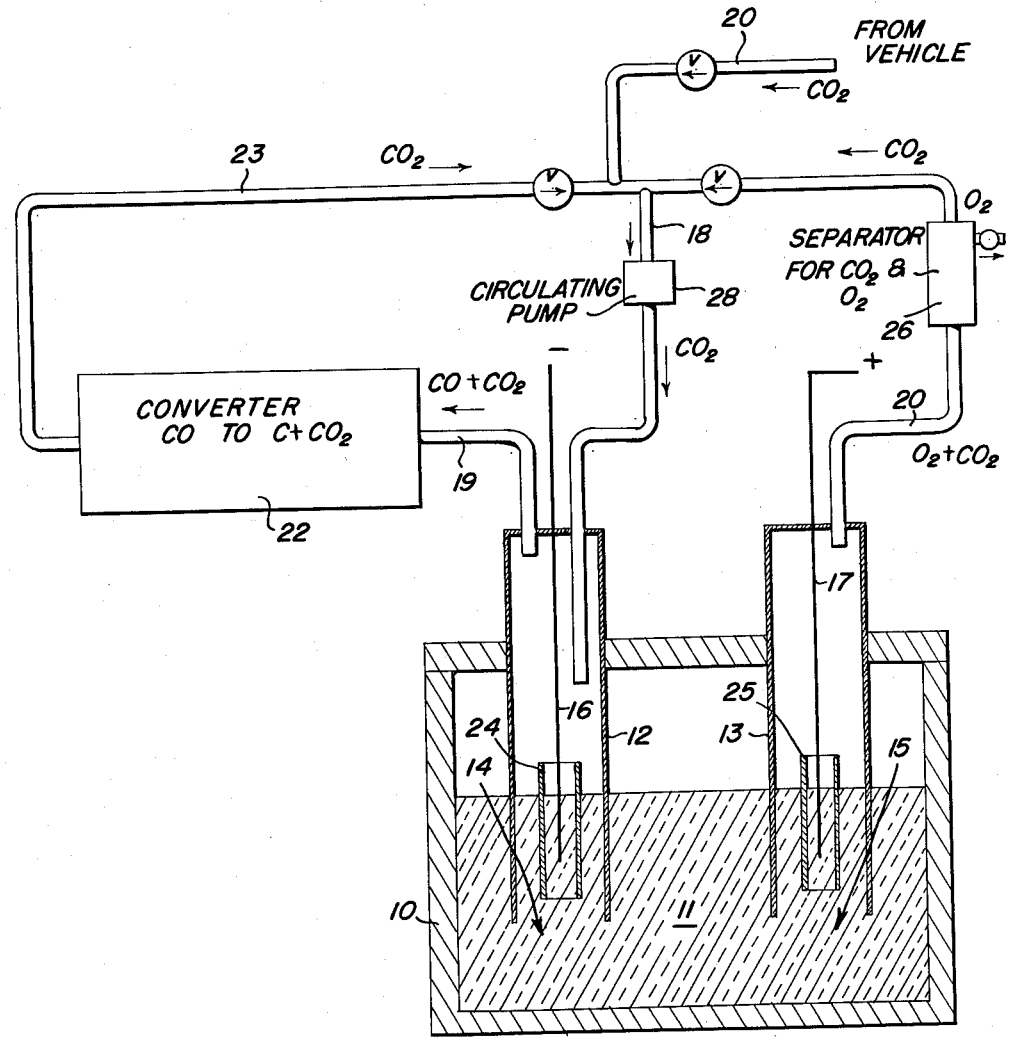

Thomas Ivan Taylor, Leonia, N.J., assignor to Isomet Corporation, Palisades Park, N.J., a corporation of New Jersey
Filed Jan. 29, 1959, Ser. No. 789,820
11 Claims. (Cl. 204—60)

The present invention relates generally to devices and processes for deriving oxygen from carbon dioxide and more particularly to a reversed fuel cell which separates $CO_2$ into $CO$ and $O_2$, respectively, at its respective electrodes, when supplied with suitable driving voltage and current, as well as to a cyclic apparatus and process for continuously converting $CO_2$ to $C$ and $O_2$, the process employing a reversed fuel cell.

It is well known that electrical energy may be generated by means of fuel cells. While such cells take a variety of forms, the simplest comprises a mass of fused sodium carbonate, or potassium carbonate, or a mixture of these placed between two electrodes separated by a porous diaphram. On supplying $CO$ or carbon containing fuels to one electrode and $O_2$ to the other, $CO_2$ is formed with the generation of electric power.

In accordance with the present invention the conventional fuel cell is reversed being supplied with $CO_2$ and electric power. Such a cell is then found to decompose $CO_2$ into $CO$, $C$ and $O_2$. The electrode reactions may be represented as follows:

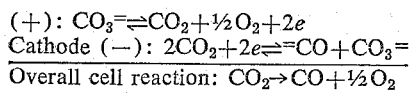

$$(+): CO_3^= \rightleftharpoons CO_2 + \tfrac{1}{2}O_2 + 2e$$
$$\text{Cathode } (-): 2CO_2 + 2e \rightleftharpoons CO + CO_3^=$$
$$\text{Overall cell reaction: } CO_2 \rightarrow CO + \tfrac{1}{2}O_2$$

At the temperature of operation of the cell, part of the $CO$ is catalytically decomposed into $C$ and $CO_2$. The remainder of the $CO$ and the excess $CO_2$ may be recycled along with additional $CO_2$ through the cathode compartment for further conversion to $C$ and $CO$. Alternatively, the $CO$ from the cathode compartment may be externally converted to $C$ and $CO_2$, the $C$ readily separated from $CO_2$ and the $CO_2$ re-cycled to the apparatus for further conversion to $C$, $CO$ and $O_2$. Since the products are generated at separated electrodes, the $O_2$ and $CO_2$ from the anode may be piped off, the $O_2$ separated from the $CO_2$ in relatively pure form, and the $CO_2$ returned to the cathode compartment for conversion to $C$, $CO$ and $O_2$.

It is found that relatively large quantities of $O_2$ may be produced in this manner with the expenditure of little electric power. According to the electrode reactions written previously, each gram molecular weight (22.4 liters at 0° and 760 mm. of mercury pressure) of $O_2$ requires four faradays (4×96,500 coulombs) of electricity. The theoretical decomposition voltage is said to be about 1.0 to 1.4 volts to which, for production of oxygen, must be added the over-voltage and the voltage needed to overcome the ohmic resistance of the cell.

A relatively high temperature is required to maintain the carbonates in a fused condition. This presents no problem in many situations, since it is not required to provide heat energy beyond that needed to make up heat leakage, and the equipment may be well heat insulated. Furthermore, the appropriate choice of carbonate mixtures can lower the temperature required. The melting points of a number of pure carbonates are listed in handbooks as follows: $K_2CO_3$, 891° C.; $Na_2CO_3$, 851° C; $Li_2CO_3$, 618° C. A mixture $K_2CO_3$ and $Na_2CO_3$ in the proportion of their molecular weights melts at 690° C. However, it was found that $K_2CO_3$, $Na_2CO_3$ and $Li_2CO_3$ mixed in the proportions of their molecular weights melted at 420° C. Since $BaCO_3$ seems to be beneficial for the anode reaction partially because of the tendency of barium to form a peroxide, the following mixture in percent by weight was prepared: 40% $K_2CO_3$; 30% $Na_2CO_3$; 20% $Li_2CO_3$ and 10% $BaCO_3$. This mixture was found to have a relatively low melting point of 396° C. and was therefore used in experimentation.

The materials for the electrode compartments can present difficulties since most insulator materials are slowly attacked by the fused carbonates, as for example quartz, porcelain, or alundum. Some refractory materials such as magnesium oxide have been found to be relatively stable. Fused zircon tubes such as those used for combustion tubes were also found to be relatively stable under the conditions used for the cell described herein.

The fuel cell employed as above is called here a reversed fuel cell and the system finds particular application in providing oxygen for life sustaining or breathable atmosphere in closed vehicles which have no access to such atmosphere, such as long range submarines or space vehicles, since the only raw material expended in the process is $CO_2$ which is generated by personnel in the vehicles and is required to be removed therefrom.

It is, accordingly, a broad object of the present invention to provide a reversed fuel cell for deriving oxygen from carbon dioxide.

It is a further object of the invention to provide a continuous process for regeneratively, and by means of a reversed fuel cell, deriving $O_2$ from $CO_2$, with $CO$ as a by-product converting the $CO$ to $C$ and $CO_2$, and feeding the $CO_2$ back to the reversed fuel cell.

The above and still further objects, features and advantages of the present invention will become apparent upon consideration of the following detailed description of one specific embodiment thereof, especially when taken in conjunction with the accompanying drawings, wherein:

The single FIGURE is a schematic diagram showing a system according to the invention.

Referring now more particularly to the accompanying drawings, the reference numeral 10 denotes a container, preferably of stainless steel. It may also be made of iron, nickel or other suitable resistant material. This vessel contains a mass 11 of a mixture of $K_2CO_3$, $Na_2CO_3$, $Li_2CO_3$ and $BaCO_3$ in the percentages by weight 40%, 30%, 20%, 10% respectively and in fused condition at about 500° C. The $K_2CO_3$, $Na_2CO_3$, or $Li_2CO_3$ may be used alone or in any combination, to which $BaCO_3$ may also be added, but the mixtures are found to fuse at lower temperatures and are therefore preferable.

Two capped compartments of fused zircon, having open lower ends 14 and 15, respectively, extend downwardly into mass 11 of the carbonates. Other resistant insulator materials such as MgO or ceramic may also be used for these electrode compartments. A negative lead 16 extends through compartment 12 and attaches to an electrode 24 partially immersed into the mass of carbonate, and similarly a positive lead 17 extends through compartment 13 and attaches to an electrode 25. Electrodes 24 and 25 consist of a roll of platinum and nickel wire screen. They may be of silver, iron alone or in combination, or with other materials such as magnetite as is well known to those experienced at the art of fuel cells.

$CO_2$ is supplied to compartment 12 via tube 18 and gas is withdrawn from 12 via tube 19. The latter gas comprises $CO$ and $CO_2$; the $CO$ being a product of the dissociation effected by the cell, and the $CO_2$ supplied over that which the cell can dissociate, in addition to $CO_2$ resulting from the dissociation of some $CO$ to $C$ and $CO_2$ by the cell materials. About an 8 volt source is connected through a rheostat to the terminals 16 and 17 in the above recited polarity. With a voltage at the terminals 16 and 17 of 4.8 volts, a current of 1 ampere flowing, there results a regeneration of about 200 cc. of oxygen and 400 cc. of $CO_2$ per hour. The $O_2$ and $CO_2$ may be drawn off by means of tube 20 into a separator 26 which separates the $O_2$ from $CO_2$ by methods well known, such as refrigeration or absorption.

The CO and $CO_2$ available at conduit 19 is supplied to furnace 22 containing a catalyst such as nickel, and in the presence of sufficient heat converts the CO to C and $CO_2$ in known fashion. The $CO_2$ is resupplied to conduit 18 by means of a circulating pump 28 for further conversion to CO and $O_2$ via conduit 23 valved by a control valve 29. Construction of the electrodes with catalytically active metals such as nickel or platinum, or incorporating catalytically active metals into the cathode compartment and operating the reversed fuel cell at the appropriate temperature for the conversion of CO to C and $CO_2$, provides an alternative to the external conversion. In this case the converter 22 is not used. It is necessary, from time to time, to remove the carbon from the fused carbonates or to provide for continuous filtration by circulating the fused carbonate mixture through a filter and compartment 12.

Carbon dioxide from a vehicle, generated by breathing of personnel or from other sources such as combustion, may be supplied to conduit 18 via a valved conduit 30.

After the reversed fuel cell system described herein has been used in a confined space or otherwise for the conversion of $CO_2$ to C and $O_2$, the carbon from the process accumulates. This carbon is in a form well suited for use in a normal fuel cell. Consequently, when air (or oxygen) is freely available, the carbon may be used to produce power. In this case the carbon remaining in electrode compartment 12 or carbon added to this compartment from the accumulated supply, or other source, serves as the fuel. Oxygen (or air) and carbon dioxide are fed to electrode compartment 13. The cell then operates as a normal fuel cell and electrical power may be drawn from electrode leads 16 and 17.

Results of experiments on the reversed fuel cell have shown that the ratio of oxygen to carbon dioxide involved in the electrode reaction is one volume of oxygen to two volumes of carbon dioxide. Thus when the cell is used for a normal fuel cell, oxygen and carbon dioxide should be supplied to electrode compartment 13 in the ratio of one to two for optimum operation. This result is of significance in the operation of fuel cells using carbon or carbon monoxide as the fuel. During the operation of the cell as a normal fuel cell, carbon dioxide is produced in electrode compartment 12. A part of this carbon dioxide can be mixed in the proper quantities with the air or oxygen supplied to compartment 13.

In special cases it may be desirable to convert the excess carbon dioxide from the cell to carbon and oxygen by some process such as one involving photochemical processes and heat energy from light or one involving nuclear radiations. The carbon and oxygen thus formed can be returned to the cell for further conversion to electrical power. The net result of this mode of operation is the conversion of the light or the nuclear radiations into electrical power.

By operating the cell, first as a reversed fuel cell, and then as a normal fuel cell, it is possible to "store power" for future use. Thus a surplus of electrical power may be used to convert $CO_2$ to C and $O_2$ in the reversed fuel cell system described herein. The carbon and oxygen formed may be allowed to accumulate and then used later to operate the cell as a normal fuel cell, thus producing power when it is needed. The carbon dioxide formed from the carbon during this part of the cycle is saved for later use in the first part of the cycle.

The reversed fuel cell arrangement described herein converts $CO_2$ to $O_2$ and C. The reversed cell can equally well be used for separating oxygen from the air. For this purpose some carbon is added initially to the cathode compartment 12, through which air is then passed at a controlled flow. The oxygen of the air forms $CO_2$ by reaction with the carbon in the compartment. The $CO_2$ is then converted to CO, C and $O_2$ by the action of the cell as described in the process for conversion of $CO_2$ to $O_2$ and C. The carbon formed is re-used to convert more $O_2$ from the air to $CO_2$ and the cycle continues. The net result is that oxygen is transferred from the air to the anode compartment 13. The $O_2$ is then readily separated by known methods from the mixture of $O_2$ and $CO_2$ which is liberated in the anode compartment 13.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A process for converting $CO_2$ gas to $O_2$ and CO comprising the steps of providing an electrolysis cell having an anode, cathode and an electrolyte containing fused carbonates of metals selected from the group consisting of Li, Na, K and Ba, supplying a flow of direct current between said anode and cathode, supplying $CO_2$ gas to said electrolyte in proximity to said cathode, removing CO from an area in proximity to said cathode, and removing $O_2$ gas from an area in proximity to said anode.

2. A process for converting $CO_2$ gas to C and $O_2$ gas comprising the steps of providing an electrolysis cell having an anode, cathode and an electrolyte containing fused carbonates of metals selected from the group consisting of Li, Na, K and Ba, supplying a flow of direct current between said anode and cathode, supplying $CO_2$ gas to said electrolyte in proximity to said cathode, removing CO and $CO_2$ gases from an area in proximity to said cathode, removing $CO_2$ and $O_2$ gases from an area in proximity to said anode, converting said gases removed from said cathode into C and $CO_2$ gas, supplying said converted $CO_2$ gas back to said cathode, separating said gases removed from said anode into $CO_2$ and $O_2$ gases, and supplying said separated $CO_2$ gas back to said cathode.

3. A process for converting $CO_2$ gas to $O_2$ gas comprising the steps of providing an electrolysis cell having an anode, cathode and an electrolyte containing fused carbonates of at least one metal, supplying a flow of direct current between said anode and cathode, supplying $CO_2$ gas to said electrolyte in proximity to said cathode, and removing $O_2$ gas from an area in proximity to said anode.

4. The process of claim 3 wherein said metal is selected from the group consisting of Li, Na, K and Ba.

5. A process for converting $CO_2$ gas to C comprising the steps of providing an electrolysis cell having an anode, cathode and an electrolyte containing fused carbonates of at least one metal, supplying direct current between said anode and cathode, supplying $CO_2$ gas to said electrolyte in proximity to said cathode, removing CO gas from an area in proximity to said cathode, and converting said CO into C.

6. A process for converting $CO_2$ gas to $O_2$ gas comprising the steps of providing an electrolysis cell having an anode, cathode and an electrolyte containing fused carbonates of at least one metal, supplying direct current between said anode and cathode, supplying $CO_2$ gas to said electrolyte in proximity to said cathode, removing $O_2$ and $CO_2$ from an area proximate said anode, separating said removed $CO_2$ gas from said $O_2$ gas, and supplying said separated $CO_2$ gas back to said electrolyte in proximity to said cathode.

7. A process for converting $CO_2$ gas to C comprising the steps of providing an electrolysis cell having an anode, cathode and an electrolyte containing fused carbonates of at least one metal, supplying a direct current between said anode and cathode, supplying $CO_2$ gas to said electrolyte in proximity to said cathode, removing CO and $CO_2$ gas from an area in proximity to said cathode, converting said CO into C and $CO_2$, and supplying said removed and converted $CO_2$ gas back to said electrolyte in proximity to said cathode.

8. A process for converting $CO_2$ gas to $O_2$ and C comprising the steps of providing an electrolysis cell having an anode, cathode and electrolyte containing fused carbonates of at least one metal, supplying direct current between said anode and cathode, supplying $CO_2$ gas to said electrolyte in proximity to said cathode, removing CO from an area in proximity to said cathode, removing $O_2$ gas from an area in proximity to said anode, and converting said removed CO to C.

9. In a process for converting $CO_2$ to $O_2$ comprising the steps of providing an electrolysis cell having an electrolyte containing fused carbonates of at least one metal, supplying a flow of direct current between said anode and cathode, supplying $CO_2$ to said cell and converting $CO_3^=$ in said electrolyte to $O_2$ in proximity to said anode.

10. In a process for converting $CO_2$ to $O_2$ comprising the steps of providing an electrolysis cell having an electrolyte containing fused carbonates of at least one metal, supplying a flow of direct current between said anode and cathode, supplying $CO_2$ to said cell, converting said $CO_2$ to CO and $CO_2$ at said cathode and converting $CO_3^=$ in said electrolyte to $O_2$ in proximity to said anode.

11. A process for converting $CO_2$ to $O_2$ comprising the steps of providing an electrolysis cell having an electrolyte containing fused carbonates of at least one metal, supplying a flow of direct current between said anode and cathode, supplying $CO_2$ to said cell, removing $CO_2$ and $O_2$ from an area in proximity to said anode, and separating the latter $CO_2$ from said $O_2$.

References Cited in the file of this patent

UNITED STATES PATENTS

| | | |
|---|---|---|
| 1,543,357 | Baur | June 23, 1925 |
| 1,588,214 | Walsh | June 8, 1926 |
| 2,384,463 | Gunn et al. | Sept. 11, 1945 |
| 2,581,650 | Gorin | Jan. 8, 1952 |
| 2,726,930 | Edwards et al. | Dec. 13, 1955 |
| 2,879,212 | Hill et al. | Mar. 24, 1959 |
| 2,898,276 | Snow | Aug. 4, 1959 |
| 2,908,619 | Barnett | Oct. 13, 1959 |

OTHER REFERENCES

Transactions of The Electrochemical Society, vol. 63, pages 197–205 (1933).